United States Patent [19]

Tomlin et al.

[11] Patent Number: 4,699,355
[45] Date of Patent: Oct. 13, 1987

[54] FAIL-SAFE FLUID PILOTED VALVE POSITIONER WITH HYDROMECHANICAL POSITION LOCK

[75] Inventors: Jerry B. Tomlin, Sugar Land, Tex.; Ronald L. Loup, Clarkston, Mich.

[73] Assignee: Koomey, Inc., Brookshire, Tex.

[21] Appl. No.: 667,297

[22] Filed: Nov. 1, 1984

[51] Int. Cl.⁴ .................. F16K 31/163; F15B 15/26; F16J 1/10
[52] U.S. Cl. ......................................... 251/62; 91/44; 92/24; 92/84; 92/128; 92/167
[58] Field of Search .................. 91/44, 45; 92/23, 24, 92/26, 27, 28, 84, 128

[56] References Cited

U.S. PATENT DOCUMENTS

| | | | |
|---|---|---|---|
| 2,815,736 | 12/1957 | Wright | 92/24 X |
| 3,036,596 | 5/1962 | Alfieri | 92/84 X |
| 3,311,030 | 3/1967 | Halstead | 92/167 X |
| 3,353,455 | 11/1967 | Berry | 92/24 |
| 3,941,141 | 3/1976 | Robert | 92/24 X |
| 3,995,534 | 12/1976 | Rastetter | 92/27 |
| 4,069,747 | 1/1978 | Forry et al. | 92/167 X |
| 4,300,664 | 11/1981 | Helm et al. | 92/24 X |
| 4,305,565 | 12/1981 | Abbe | 92/24 X |
| 4,444,216 | 4/1984 | Loup | 137/116 |
| 4,531,548 | 7/1985 | Gottling et al. | 92/146 X |
| 4,565,349 | 1/1986 | Tomlin | 91/44 X |

FOREIGN PATENT DOCUMENTS

| | | | |
|---|---|---|---|
| 829975 | 5/1938 | France | 91/44 |
| 56166108 | 10/1983 | Japan | 92/27 |
| 163740 | 8/1964 | U.S.S.R. | 92/28 |
| 262355 | 5/1970 | U.S.S.R. | 92/28 |

Primary Examiner—Robert E. Garrett
Assistant Examiner—George Kapsalas
Attorney, Agent, or Firm—Fulbright & Jaworski

[57] ABSTRACT

A fail-safe system for use on a hydraulic piloted pressure reducing and regulating valve for holding the valve at the last selected operating pressure in the event of loss of control signals. A pressure regulating valve having a body and a control piston therein is provided with a pilot piston in the body which is adapted to be connected to and responsive to a hydraulic signal pilot pressure. A segmented locking ring surrounds the assembly and coacting concentric V-shaped locking grooves are provided between the locking ring and the assembly for locking the assembly. The segmented ring is biased towards an unlocked position. An annular cam ring engages the exterior of the locking ring. Coacting wedge surfaces between the cam ring and the locking ring are provided for locking and releasing the locking ring. The cam ring is biased for urging the coacting wedge surfaces into engagement. A release piston engages the cam ring for moving the cam ring in a direction to disengage the coacting wedge surfaces upon the application of release pressure.

3 Claims, 4 Drawing Figures

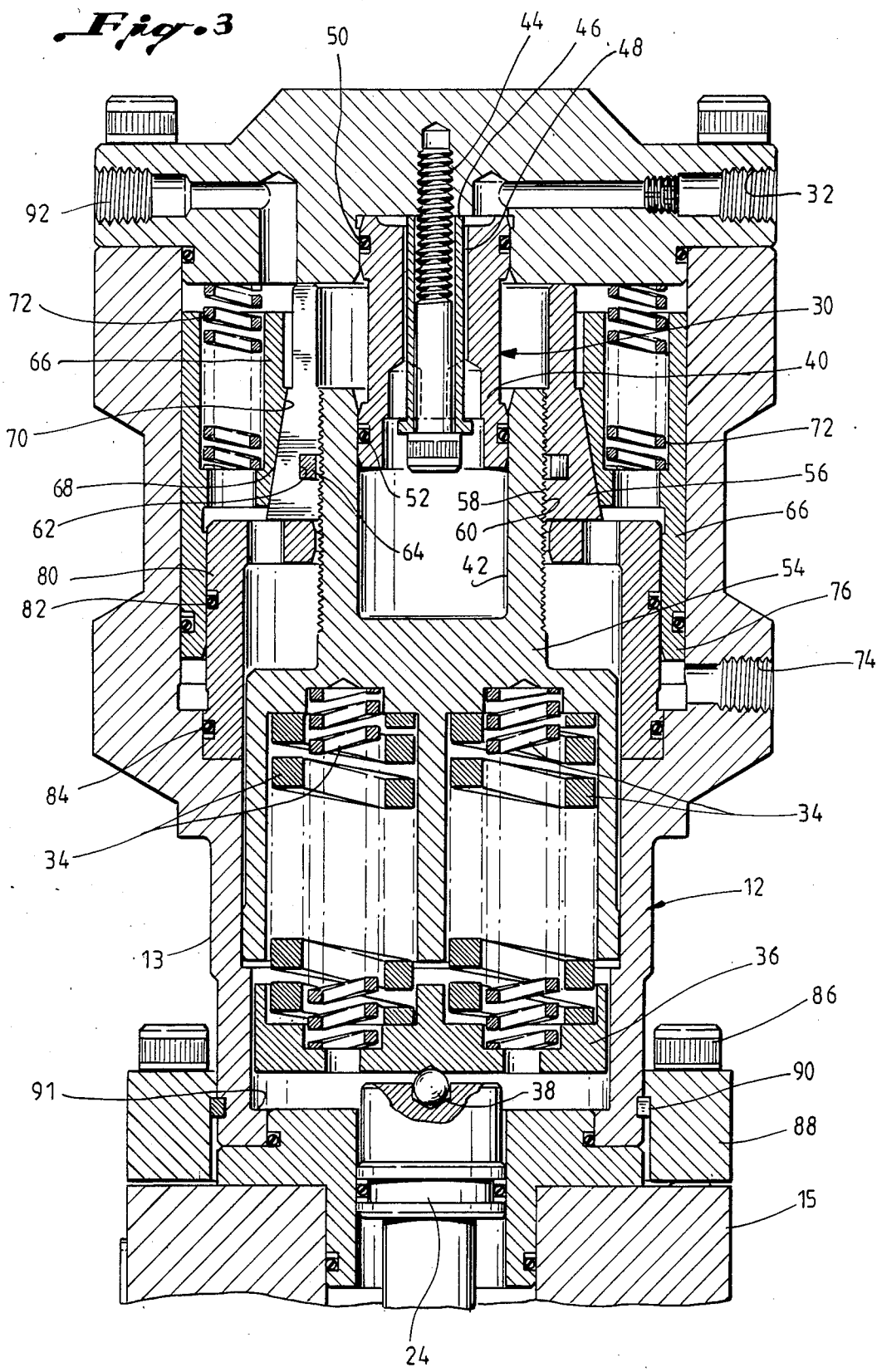

FAIL-SAFE FLUID PILOTED VALVE POSITIONER WITH HYDROMECHANICAL POSITION LOCK

BACKGROUND OF THE INVENTION

In controlling various oil tool equipment, such as blowout preventers, production trees and other hydraulically actuated equipment, it is customary to supply a hydraulic fluid supply at a high pressure, for example, 3,000 psi. However, the equipment works at a pressure lower than the supply pressure and it is necessary to reduce and regulate the pressure to the desired working pressure for the equipment. However, in a pilot controlled pressure reducing and regulating valve if the control system fails, causing a loss of the pilot signal, this is equivalent to venting off the regulated pressure to zero. This means that the equipment being operated by the outlet supply pressure becomes inoperative and in the case of safety equipment, such as oil well blowout preventers, this could lead to disaster. U.S. Pat. No. 4,444,216 and United States patent application Ser. No. 591,369, filed Mar. 20, 1984 now U.S. Pat. No. 4,565,349, entitled "Fail Safe Hydraulic Pilot Pressure Reducing and Regulating Valve", disclosed two types of fail safe systems for use with a pressure reducing and regulating valve.

The present invention is directed to an improved fail-safe system for use on any type of fluid piloted pressure actuated mechanism such as a hydraulically piloted pressure reducing and regulating valve in which the parts are suitable for repair in the field, the fail-safe system can be unlocked with a minimum of pressure and will not be detrimentally affected by higher pressures, and the locking member does not require fluid seals and therefore has no seal drag to affect its sensitivity of adjustment.

SUMMARY OF THE INVENTION

The present invention is directed to a fail-safe system for use on a fluid piloted pressure actuated mechanism for holding the mechanism at its last selected position in the event of loss of control signals. The actuated mechanism includes a body and a control piston. The fail-safe system includes a pilot piston and cylinder assembly in the body adapted to be connected to and responsive to a fluid signal pilot pressure. Spring means between the control piston and the assembly are provided whereby the mechanism is moved in response to the fluid signal pilot pressure. A locking ring surrounds the assembly and coacting locking grooves and serrations are provided between the assembly and the locking ring for locking the assembly when the grooves and serrations are engaged. Biasing means engage the locking ring for biasing the ring away from the assembly for unlocking the ring from the assembly. A cam ring is engageable with the exterior of the locking ring and coacting wedge surfaces between the cam ring and the locking ring are provided for locking and releasing the locking ring to and from the assembly. Biasing means acts on the cam ring for yieldably urging the coacting wedge surfaces into engagement. A release piston engages the cam ring for moving the cam ring in a direction to disengage the coacting wedge surfaces.

A further object of the present invention is wherein the coacting locking grooves and serrations are coacting concentric V-shpaed grooves.

Still a further object of the present invention is wherein a spring plate is provided in the body engaging the bottom end of the spring means that is between the pilot piston and the assembly. An internal shoulder is provided in the body below the spring plate for engaging the spring plate when the fail-safe system is disconnected from the mechanism.

Still a further object of the present invention is wherein a shoulder ring is provided in the body engaging the bottom of the locking ring for holding the locking ring against longitudinal movement. The body includes a fluid release port and the shoulder ring has upper and lower seals on opposite sides of the release port. The lower seal has a larger outside diameter than the upper seal whereby when release pressure is applied to the release port the shoulder ring is pressure biased away from the locking ring.

Still a further object of the present invention is wherein the pilot piston and cylinder assembly includes means securing the pilot piston to the body and the pilot piston includes a passageway therethrough for transmitting pilot fluid pressure to the cylinder. First seal means is provided between the piston and the cylinder and second seal means are provided between the piston and the body. The first seal means has a larger outside diameter than the second seal means whereby the pilot piston is pressure biased towards the body by the pilot signal fluid pressure.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 3 is an enlarged elevational view, in cross section, illustrating the fail-safe system of the present invention shown in the locked position.

DESCRIPTION OF THE PREFERRED EMBODIMENT

While the present invention will be described for purposes of illustration only, as applied to a hydraulic piloted pressure reducing and regulating valve, the present fail-safe system can be used with various types of other fluids, such as air, and on other types of fluid pressure actuated mechanisms.

Figure 1:
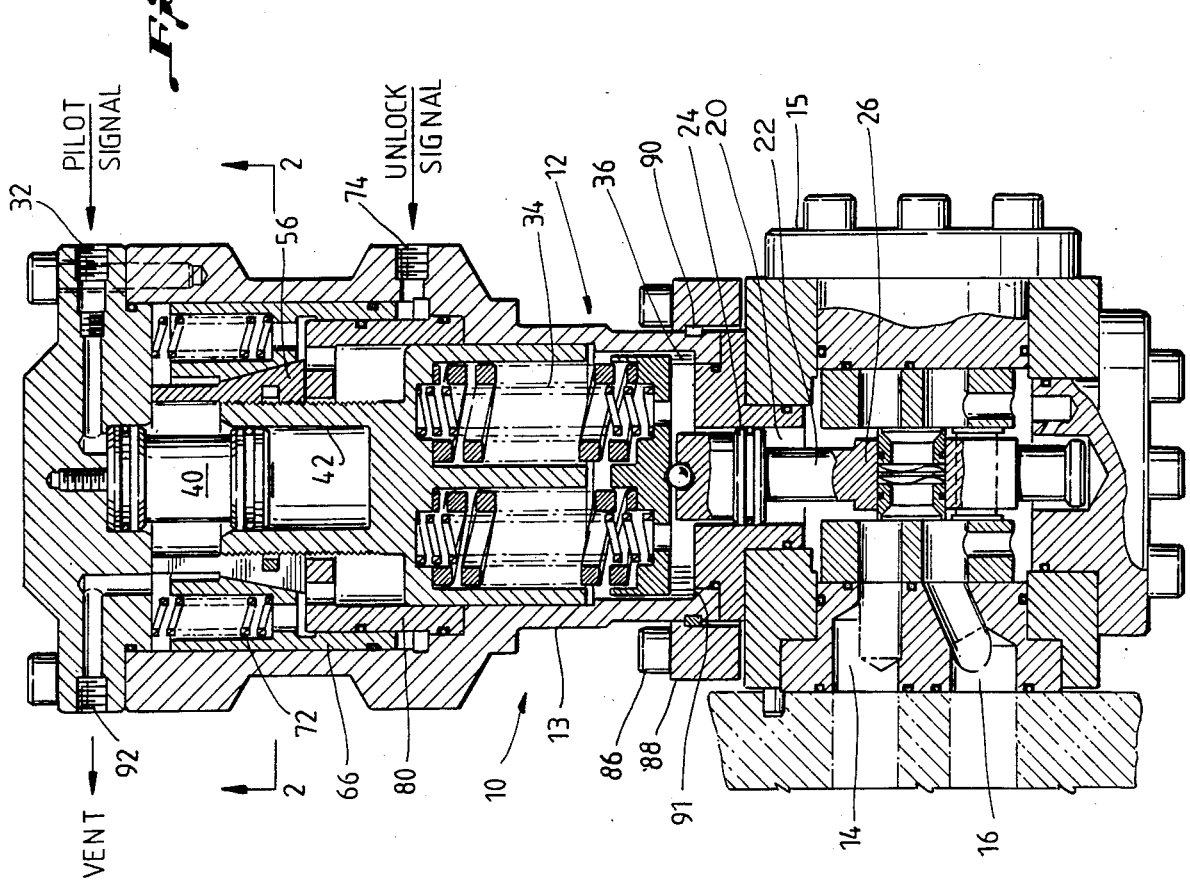
FIG. 1 is an elevational view, in cross section, of the fail safe system of the present invention connected to a pressure reducing and regulating valve in which the fail-safe system is shown in the locked position.

Referring now to the drawings, and particularly to FIG. 1, the reference numeral 10 generally indicates a hydraulic piloted pressure reducing and regulating valve and generally includes a body 12 having a fluid inlet 14, a fluid outlet 16 and a vent (not shown). Generally, a hydraulic pressure supply source is connected to the inlet 14 and hydraulic pressure is supplied at the outlet 16 which is reduced and regulated for operating other equipment. The body 12 has a body cavity 20, a plunger 22 movable in the body and a control piston 24 connected to the plunger 22 and exposed to pressure in the body cavity 20.

A seal container 26 is connected to the piston 24 and is movable in the body cavity 20. The seal container 26 contains a plurality of openings and seals as are conventional to move relative to the fluid inlet port 14, outlet 16 and vent to provide a reduced and regulated outlet flow. A fuller description of a suitable pressure reducing and regulating valve is more fully described in U.S. Pat. No. 4,444,216, which is incorporated herein by reference. The above description is generally conventional and other suitable pressure reducing and regulating valves may be used.

In pilot actuated pressure reducing and regulating valves, the piston is subjected to various pilot actions such as a hydraulic control pressure, or an air control pressure. The present invention is directed to a fluid pressure actuated mechanism, such as a hydraulic piloted pressure reducing valve which is fail safe in order to provide a regulating valve that stays at its last selected operating pilot pressure. U.S. Pat. No. 4,444,216 and U.S. Pat. No. 4,565,349, each describe one type of a fail-safe system on a pressure regulating valve so that if the pilot control signal is lost, the regulating valve is locked in at its last selected operating pressure in order to insure that the valve continues to supply hydraulic power.

Figure 2:
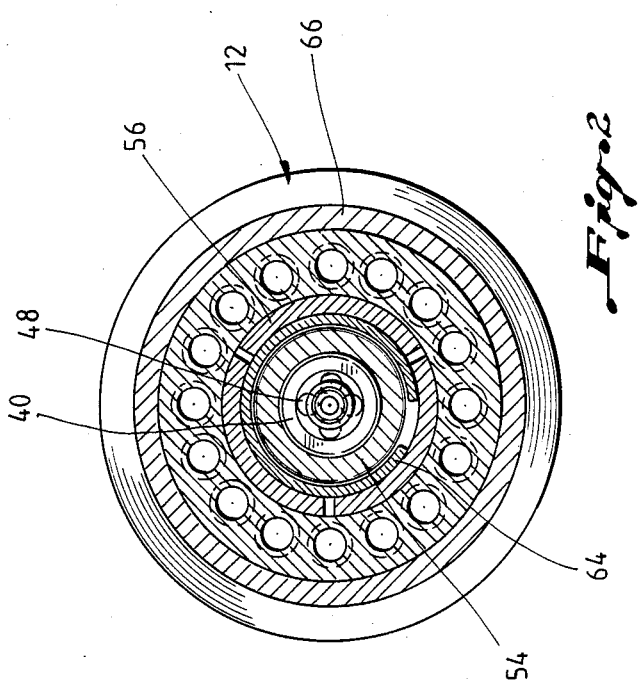
FIG. 2 is a cross-sectional view taken along the line 2—2 of FIG. 1.

Referring now to FIGS. 1–3, the present invention includes a piston and cylinder assembly, generally indicated by the reference numeral 30, positioned in the body 12 and exposed to and responsive to hydraulic signal pressure in a hydraulic pilot pressure port 32. Suitable spring means such as springs 34 may be provided between the piston and cylinder assembly 30 and the control piston 24 including spring plate 36 and bearing ball 38. Thus, as piloted signal hydraulic pressure is communicated to the port 32, the piston and cylinder assembly 30 will move in the body 12 in response to the pilot pressure thereby applying the pilot pressure force to the springs 34 which in turn apply the pilot control force to the control piston 24 for adjusting its position in the body 12 relative to the regulated pressure in the cavity 20 thereby regulating the pressure output in the outlet 16.

While the piston and cylinder assembly 30 may be of any suitable configuration, as best seen, the assembly 30 includes a piston member 40 and a cylinder 42 movable relative to each other. The piston 40 is secured to the body by a bolt 44 and spacer 46 so that the piston 40 is generally fixed. The piston 40 includes a plurality of passageways 48 therethrough which are in communication on one side with the pilot pressure port 32 and at the other side with the interior of the cylinder 42. The piston 40 is free to move to a small extent to offset the effects of tolerance accumulation to meet the number of cylindrical fits involved. The piston 40 includes an upper O-ring seal 50 and a lower O-ring seal 52. The diameter of the O-ring seal 52 is slightly larger than the diameter of the O-ring seal 50. Therefore, the piston 40 is slightly pressure biased by the pilot signal presure towards the top of the body 12. Signal pilot pressure at the port 32 will in effect cause the cylinder 42 which includes a mandrel 54 to move longitudinally to act on the springs 34 and controls the movement of the control piston 24 for regulating the pressure output of the valve.

In order to hold the mandrel 54 of the assembly 30 in a fixed position in the event of a loss of pilot pressure at the port 32, a segmented lock ring 56 is provided engaging and surrounding the exterior of the mandrel 54. Coacting locking grooves and serrations 58 and 60 are provided on the interior of the locking ring 56 and the exterior of the mandrel 54, respectively. Preferably, the serrations and grooves 58 and 60 are V-shaped concentric grooves having a 1/32 nd pitch. The pitch of the serrations versus the spring load of the springs 34 provide a sensitivity of adjustment range of within approximately 50 psi on the regulated output pressure of the valve 10. Preferably the segmented lock ring 56 is manufactured as a one piece cylinder with the internal diameter serrated with a V-shaped profile and then cut into three segments to insure a uniform gripping action by each segments relative to the mandrel 54. The locking ring 56 includes an internal groove 62 in which is placed a biasing means such as a ring spring 64 to bias the segments of the locking ring 56 away from the mandrel 54 of the assembly 30 for unlocking the locking ring 56 from the assembly 30.

An annular cam ring 66 is longitudinally movable in the body 12 and is engagable with the exterior of the locking ring segments 56. Coacting wedge surfaces 68 and 70 are provided on the locking ring 56 and annular cam ring 66, respectively, for locking and releasing the locking ring 56 to and from the mandrel 54. Biasing means such as a plurality of springs 72 are provided acting between the inside of the body 12 and the cam ring 66 for yieldably urging the coacting wedge surfaces 68 and 70 into engagement and for locking the locking ring 56 into engagement with the mandrel 54.

The body 12 includes an unlock or release port 74 for releasing the fail safe system when it is desired to change the regulated pressure of the valve 10 by moving the mandrel 54. A release piston 76 is provided engaging, and preferably forming a part of the cam ring 66, whereby upon application of release hydraulic pressure at the port 74, the piston 76 will move upwardly moving the cam ring 66 upwardly overcoming the springs 72. This action retracts the wedge surface 70 from the wedge surface 68 on the locking ring 56 which in turn allows the ring spring 64 to retract the locking ring 56 from the mandrel 54.

An annular shoulder ring 80 is provided in the housing 12 for supporting the bottom of the locking ring segments 56 for holding the locking ring 56 against longitudinal movement. The shoulder ring 80 has an upper O-ring seal 82 and a lower O-ring seal 84. The O-ring seals 82 and 84 are on opposite sides of the unlock or release port 74. The O-ring seal 84 has a larger diameter than the O-ring seal 82. Therefore, the shoulder ring 80 is pressure biased by release pressure away from the locking ring 56 when release pressure is applied to the release port 74. This action insures that the segmented lock ring 56 is free to float and expand outwardly when the cam ring 66 moves away.

Referring now to FIGS. 1 and 3, the top portion 13 of the housing 12 is secured to the bottom portion 15 of the housing 12 by bolts 86 by means of a flange 88 and split ring 90. The upper portion 13 of the housing 12 includes an inwardly directed shoulder 91 below the spring plate 36 for engaging the spring plate 36 when the upper housing 13 is disconnected from the lower housing 15. This prevents an accident in the event that an operator decides to remove the upper housing 13 without unlocking the mandrel 54 and releasing the load on the spring 34. A further advantage is that the failsafe system located and the upper housing 13 can be assembled and stocked as a separate entity and installed on the lower regulator body portion 15 as needed.

The present fail-safe system has several advantages over the system described in U.S. Pat. No. 4,565,349. First, the present invention has simple mechanical parts which can be assembled and disassembled in the field while the prior art device is a very critical operating device which required service and repair at the plant. Secondly, the present system can be unlocked with any hydraulic fluid pressure in excess of 650 psi which will overcome the springs 72 to shift the cam ring 66 upwardly. Any additional pressure will not change the operation but the structure allows higher pressure to be applied without detrimentally affecting the components. The prior art device required a minimum of 2,000 psi to unlock but could not withstand higher pressures than 3,000 psi without risking the hazard of overstressing the locking sleeve. Thirdly, the locking ring 56 does not have a seal which would affect its sensitivity while the prior art device required seals against the sleeve which provided a resultant seal drag which substantially affected the sensitivity of adjustment of the regulator.

The body 12 includes a vent port 92 which, if used, subsea will be exposed to subsea hydrostatic head pressures either by the entry of seawater into the housing 12 or by means of a pressure compensator 94 (FIG. 4) filled with a suitable friendly fluid which will compensate for changes in volume due to the operation of the regulator or due to temperature and/or pressure fluctuations.

When the locking ring 56 is engaged and locks the mandrel 54 the pilot pressure at the port 32 can be vented to zero without resulting in a change in the regulated output pressure of the valve 10. Therefore, if the pilot signal hose happens to break, while it is in the locked position, then the operation is in a fail-safe mode, maintaining the system at the last desired pressure. When it is desired to change the regulated pressure of the valve 10, release hydraulic pressure is applied to the release port 74 for releasing the lock 56 and thereafter the suitable signal pressure may be applied to the port 32 for acting on the piston and cylinder assembly 30 to change the regulated hydraulic fluid output.

Figure 4:
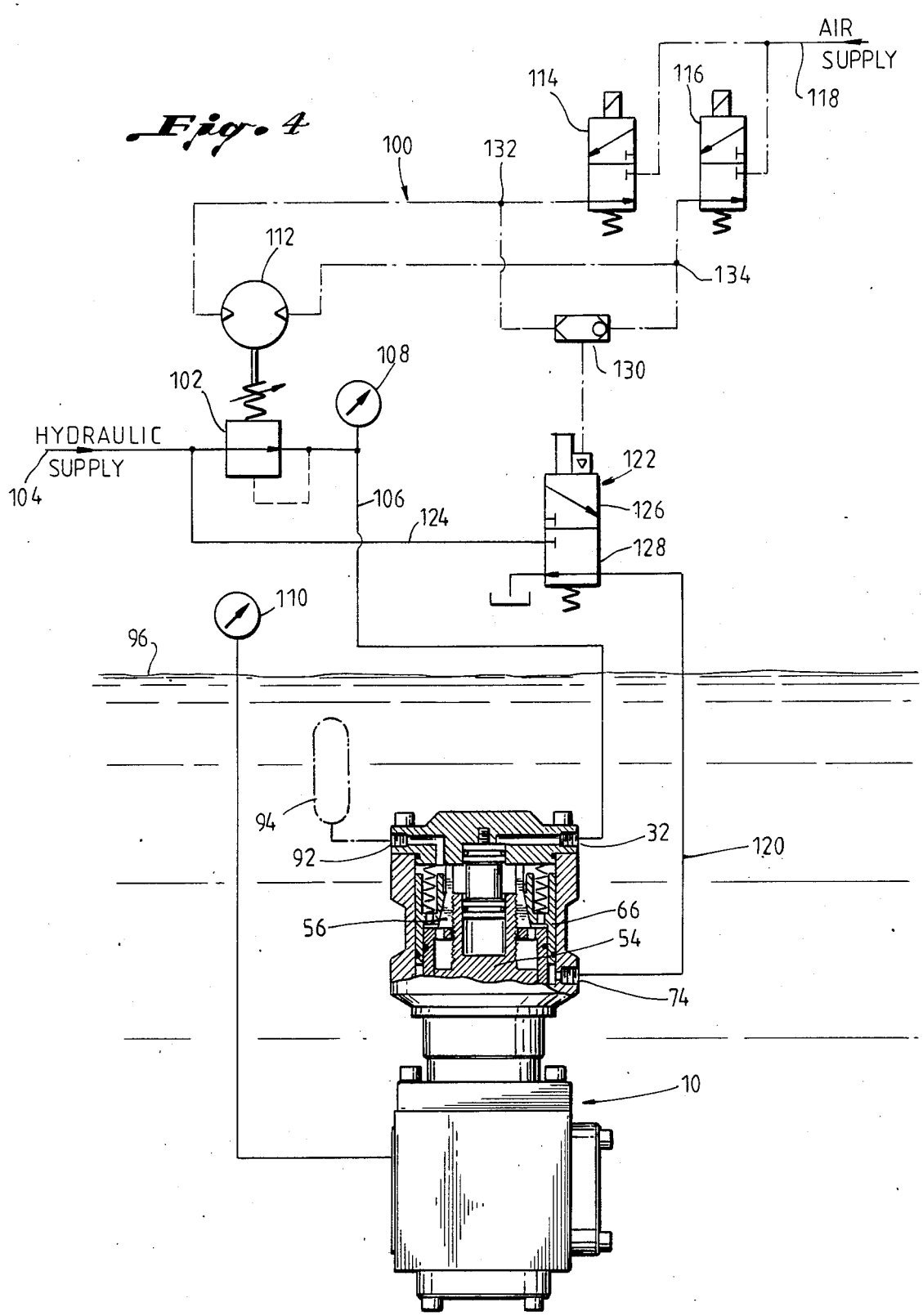
FIG. 4 is a schematic view of the fail safe system of the present invention in a control circuit.

Referring now to FIG. 4, a suitable control circuit for operating a hydraulic piloted pressured reducing and regulator valve 10 is best seen. For purposes of illustration, it will be assumed that the valve 10 is below a water surface 96 for receiving underwater hydraulic power and for regulating the pressure of the hydraulic power supply to actuate underwater equipment. The control circuit is generally indicated by the reference numeral 100. A second pilot operated hydraulic pressure reducing and regulating valve 102 is provided above water such as Part No. 1111-8700 sold by Koomey, Inc. Valve 102 has its inlet connected to a hydraulic supply 104 such as 3,000 psi and an outlet connected to a hydraulic signal pressure line 106 which is connected to the pilot pressure port 32 and thus to the piston and cylinder assembly 30 of the valve 10. Gauge 108 measures the output and thus the pilot pressure being supplied to the piston and cylinder assembly 30. Gauge 110 measures the output pressure of valve 10.

The surface pressure regulator 102 is controlled by a pilot air motor 112 which in turn adjusts the regulator 102 by valve 114 or 116. Valves 114 and 116 are connected to an air control supply 118. By actuation of one of the valves the motor 112 is rotated in one direction such as to increase the regulated pressure from the valve 102 or rotated in the opposite direction to decrease the regulated pressure. Thus actuation of the valve 114 actuates the air motor 112 in a direction to increase the regulated pressure from the valve 102 which in turn increases the regulated pressure of the subsurface pressure regulating valve 10. Valve 116 actuates the motor 112 in a direction to decrease the regulated pressure.

However without the fail-safe locking system, if the hydraulic supply 104 were lost, the pilot pressure line 106 were broken, the control circuit 100 failed, or the air supply 118 were lost, the pilot signal to the pilot and cylinder assembly 30 would be lost which would be equivalent to issuing a command signaling the valve 10 to vent off its regulated pressure at its outlet 16 to zero. This would result in a failure to supply fluid to the subsurface equipment being controlled by the valve 10. This could be a catastrophe in the case where the subsea equipment was a blowout preventer to protect an oil or gas well from a blowout.

However, the locking ring 56 provides a fail-safe structure that holds the pressure regulating valve 10 at its last selected operating pressure irrespective of the loss of the pilot pressure signal to the pilot pressure piston and cylinder assembly 30. That is, the release port 74 which controls the position of the cam ring 66 is connected separately to the hydraulic supply 104 and to the control system 100 whereby various failures will still allow the valve 10 to maintain its last selected operating presure. The unlock or release port 74 is connected by a hydraulic line 120 to a hydraulic switching valve 122 positioned above the water surface. The valve 122 is connected between the hydraulic supply 104 by a hydraulic line 124 and includes a first position 126 for supplying hydraulic fluid to the line 120 and is movable to a second position 128 for venting pressure from the line 120. The hydraulic switching valve 122 is controlled by the air supply control circuit 100 through a shuttle valve 130. The shuttle valve 130 is connected at points 132 and 134 which are the pressure outputs of the valves 114 and 116, respectively. Thus, at any time one of the valves 114 or 116 is supplying air pressure to the control motor 112, control pressure is supplied to the shuttle valve 130 to actuate the pilot on the switching valve 122 to transmit hydraulic fluid to the line 120 and to the port 74 to unlock the cam ring 66. That is, each time it is desired to change the regulation of the second regulating valve 102 in order to change the pilot pressure to the valve 10, the cam ring 66 is unlocked. After the motor 112 has been moved to the desired position to regulate the valves 102 at the desired pressures, the valves 114 and 118 are released to the vent position. This will vent the pilot control on the valve 122 through the shuttle valve 130 and will move the valve 122 to the vent position 128 which in turn vents the line 120 and allows the cam ring 66 to lock and hold the mandrel 54 in the locked position.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts wil readily suggest themselves to those skilled in the art and which are encompassed within the spirit of the invention and the scope of the appended claims.

What is claimed is:

1. A fail-safe system for use on a hydraulic piloted pressure reducing and regulating valve, having a body and a control piston therein, for holding the mechanism at the last selected operating position in the event of loss of control signals comprising,
- a floating pilot piston and cylinder assembly in said body adapted to be connected to a variable fluid signal pilot pressure,
- spring means between the control piston and the assembly whereby the valve is regulated in response to fluid signal pilot pressure,
- a locking ring surrounding said assembly,
- coacting locking grooves and serrations between the assembly and the locking ring for locking the assembly when the grooves and serrations are engaged,
- biasing means engaging said locking ring for biasing the ring away from the assembly for unlocking the ring from the assembly,
- a cam ring engagable with the exterior of the locking ring,
- coacting wedge surfaces between the cam ring and the locking ring for locking and releasing the locking ring to and from the assembly,
- biasing means acting on the cam ring for yieldably urging the coacting wedge surfaces into engagement,
- a release piston engaging said cam ring for moving the cam ring in a direction to disengage said coacting wedge surfaces,
- a spring plate in the body engaging the bottom end of the spring means between the pilot piston and the assembly, and an internal shoulder in the body below the spring plate for engaging the spring plate when the fail safe system is disconnected from the mechanism.

2. A fail-safe system for use on a hydraulic piloted pressure reducing and regulating valve, having a body and a control piston therein, for holding the mechanism at the last selected operating position in the event of loss of control signals comprising,
- a floating pilot piston and cylinder assembly in said body adapted to be connected to a variable fluid signal pilot pressure,
- spring means between the control piston and the assembly whereby the valve is regulated in response to fluid signal pilot pressure,
- a locking ring surrounding said assembly,
- coacting locking grooves and serrations between the assembly and the locking ring for locking the assembly when the grooves and serrations are engaged,
- biasing means engaging said locking ring for biasing the ring away from the assembly for unlocking the ring from the assembly,
- a cam ring engagable with the exterior of the locking ring,
- coacting wedge surfaces between the cam ring and the locking ring for locking and releasing the locking ring to and from the assembly,
- biasing means acting on the cam ring for yieldably urging the coacting wedge surfaces into engagement,
- a release piston engaging said cam ring for moving the cam ring in a direction to disengage said coacting wedge surfaces,
- a shoulder ring in the body engaging the bottom of locking ring for holding the locking ring against longitudinal movement,
- said body having a fluid release port,
- said shoulder ring having upper and lower ring seals on opposite sides of the release port,
- said lower ring seal having a larger outside diameter than the upper ring seal for pressure biasing the shoulder ring away from the locking ring when release pressure is applied to the release port.

3. A fail-safe system for use on a hydraulic piloted pressure reducing and regulating valve, having a body and a control piston therein, for holding the mechanism at the last selected operating position in the event of loss of control signals comprising,
- a floating pilot piston and cylinder assembly in said body adapted to be connected to a variable fluid signal pilot pressure,
- spring means between the control piston and the assembly whereby the valve is regulated in response to fluid signal pilot pressure,
- a locking ring surrounding said assembly,
- coacting locking grooves and serrations between the assembly and the locking ring for locking the assembly when the grooves and serrations are engaged,
- biasing means engaging said locking ring for biasing the ring away from the assembly for unlocking the ring from the assembly,
- a cam ring engagable with the exterior of the locking ring,
- coacting wedge surfaces between the cam ring and the locking ring for locking and releasing the locking ring to and from the assembly,
- biasing means acting on the cam ring for yieldably urging the coacting wedge surfaces into engagement,
- a release piston engaging said cam ring for moving the cam ring in a direction to disengage said coacting wedge surfaces,
- said pilot piston and cylinder includes,
  - means securing the pilot piston to the body,
  - said pilot piston including passageway means for transmitting pilot fluid pressure to the cylinder,
  - first seal means between the piston and the cylinder and second seal means between the piston and the body, and
  - said first seal means having a larger outside diameter than the second seal means whereby the pilot piston is pressure biased toward the body by pilot signal fluid pressure.

* * * * *